US007945849B2

(12) United States Patent
Calvert et al.

(10) Patent No.: US 7,945,849 B2
(45) Date of Patent: May 17, 2011

(54) IDENTIFYING APPROPRIATE CLIENT-SIDE SCRIPT REFERENCES

(75) Inventors: Simon Calvert, Issaquah, WA (US); Nikhil Kothari, Sammamish, WA (US); Matthew E. Gibbs, Redmond, WA (US); Bertrand Claude Le Roy, Bellevue, WA (US); Eilon J. Lipton, Bellevue, WA (US); Michael James Harder, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 11/688,567

(22) Filed: Mar. 20, 2007

(65) Prior Publication Data

US 2008/0235325 A1    Sep. 25, 2008

(51) Int. Cl.
G06F 17/24 (2006.01)
(52) U.S. Cl. ....................................... 715/205; 709/203
(58) Field of Classification Search .................. 715/205; 709/203
See application file for complete search history.

(56) References Cited

U.S. PATENT DOCUMENTS

| 5,404,528 | A |   | 4/1995 | Mahajan |
| 5,732,219 | A | * | 3/1998 | Blumer et al. ................ 709/227 |
| 5,951,697 | A | * | 9/1999 | O'Donnell et al. ............ 714/37 |
| 6,078,743 | A |   | 6/2000 | Apte et al. |
| 6,256,772 | B1 | * | 7/2001 | Apte et al. .................... 717/100 |
| 6,536,037 | B1 | * | 3/2003 | Guheen et al. ................ 717/151 |
| 6,665,658 | B1 |   | 12/2003 | DaCosta |
| 6,779,172 | B1 |   | 8/2004 | Weerawarana et al. |
| 7,143,088 | B2 |   | 11/2006 | Green |
| 2003/0236577 | A1 |   | 12/2003 | Clinton |
| 2004/0019648 | A1 | * | 1/2004 | Huynh et al. ................ 709/206 |
| 2004/0044992 | A1 | * | 3/2004 | Muller et al. ................ 717/124 |
| 2004/0225491 | A1 |   | 11/2004 | Chang |
| 2005/0216825 | A1 | * | 9/2005 | Teague ........................ 715/501.1 |
| 2006/0070022 | A1 |   | 3/2006 | Ng |
| 2006/0190561 | A1 |   | 8/2006 | Conboy |
| 2006/0190929 | A1 | * | 8/2006 | Bennett et al. ................ 717/124 |
| 2006/0230011 | A1 |   | 10/2006 | Tuttle |
| 2006/0234548 | A1 |   | 10/2006 | Qing et al. |
| 2006/0248166 | A1 |   | 11/2006 | Milosevic |
| 2007/0061700 | A1 |   | 3/2007 | Kothari |
| 2007/0101258 | A1 |   | 5/2007 | Xu |
| 2007/0113188 | A1 |   | 5/2007 | Bales |
| 2007/0198705 | A1 | * | 8/2007 | Fenton et al. ................ 709/224 |

(Continued)

OTHER PUBLICATIONS

Kutinsky, Vladimir, "Client-Server HTTP Communications Made Easy", 2007, APL Quote Quad, pp. 15-20.*

(Continued)

*Primary Examiner* — Doug Hutton
*Assistant Examiner* — James J Debrow
(74) *Attorney, Agent, or Firm* — Workman Nydegger

(57) ABSTRACT

The present invention extends to methods, systems, and computer program products for identifying appropriate client-side script references. Embodiments of the invention facilitate tailoring a list of script references to send to a Web browser based on a list of script references included in a server page. Referenced scripts sent to a Web browser can differ from referenced scripts included in the server page. Script references sent to a Web browser can refer to scripts optimized for the execution environment of the Web browser and to scripts stored at preferred script sources. Further, duplicate script references are removed prior to sending a list of script references to the Web browser. Since script lists sent to Web browsers are tailored for execution environment and duplicates are removed, scripts can be loaded and processed more effectively at Web browsers.

18 Claims, 2 Drawing Sheets

U.S. PATENT DOCUMENTS

2008/0072053 A1\* 3/2008 Halim .......................... 713/176
2009/0094249 A1 4/2009 Hawkins

OTHER PUBLICATIONS

Yu et al.,"Better Abstractions for Secure Serve-Side Scripting", ACM, 2008, pp. 507-516.\*

Johnathan Hawkins, "Search Enabling Silverlight and AJAX Web Applications", 2007, 3 pages, http://blogs.msdn.com/jhawk/archive/2007/05/23/searching-enabling-silverlight-and-ajax-web-applications.aspx.

TechPatterns.com, "Scripts-Javascript Browser & OS Detection", Browser Detector Scripts—Javascript, 2007, 3 pages, http://techpatterns.com/downloads/javascript_browser_detection.php.

Nikhil Kothari, "SEO for Ajax and Silverlight Applications", 2007, 9 pages, http://www.nikhilk.net/AjaxSEO.aspx.

Supplemental Notice of Allowance dated Jan. 27, 2010 cited in U.S. Appl. No. 11/868,304.

Teknic, Inc., "The price/performance leader for OEM machine automation Rapid Protoyping Environment Script Development Interface", 2006, 4 pages, http://www.teknic.com/systems/rapid_prototyping.php.

Notice of Allowance dated Oct. 30, 2009 cited in U.S. Appl. No. 11/868,304.

Nikhil Kothari's WebLog "Script #", http://www.nikhilk.net/ScriptSharpIntrc.aspx. Posted Jun. 5, 2006, 66 pages.

U.S. Appl. No. 12/644,466, filed Aug. 3, 2010, Office Action.

U.S. Appl. No. 12/644,466, filed Oct. 4, 2010, Notice of Allowance.

"Wingware's Python IDE", Feb. 15, 2007 http://wingware.com/.

\* cited by examiner

IDENTIFYING APPROPRIATE CLIENT-SIDE SCRIPT REFERENCES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

For example, scripts can be used to perform more complex operations than otherwise allowable using only HTML directives. Generally, scripts are executable code that can be executed at a Web server to add content to a page or can be sent down to a Web browser for execution at the Web browser to add content to a Web page. Scripts can be developed in a scripting (programming) language, such as, for example, JavaSript, VBScript, ASP, PUP, Perl, or ASP.Net. A web server can maintain pages that include both server-side and client-side scripts. Server-side scripts can be used to obtain data accessible to a Web server for inclusion in a corresponding Web page. Client side scripts are useful for acquiring and presenting data that may be unique to a client machine, such as, for example, a local time and date. However, more complex client side scripts, such as, for example, that request data or additional scripts from the Web server or other Web servers, are also possible.

When a Web server receives a Web browser request for a Web page that includes server-side script, the Web server passes the server-side script off to an appropriate script engine. The script engine processes the script to perform actions on relevant data and potentially returns portions of the relevant data, for example, represented in corresponding HTML directives. Any portions of relevant data, for example, the representative HTML directives, are then injected into a Web page for return to the Web browser (along with any client-side scripts).

For example, if a server-side script is configured to query and return 10 database rows, the script engine returns the 10 database rows in a HTML format to the Web server. The Web server then injects the HTML representing the 10 database rows into any other HTML directives and client-side scripts in the Web page. After all server-side scripts are processed, the resulting HTML from processing the server side-scripts, other HTML, and any client-side scripts are sent back to the Web browser.

Client-side scripts can be embedded in a Web page or can be included in a separate file. When a client-side script is included in an external file, a Web page can include a script reference (e.g., <script type="text/javascript" src="hello.js"></script>) referencing the script. Client-side scripts and script references can be included in-line in a Web page that is sent to a Web browser. Thus, as the Web browser processes the Web page it can encounter embedded client-side scripts as well as script references to client-side scripts.

A Web page can be designed such that tens or even hundreds of scripts are to be executed at a client when rendering a Web page. For a Web browser to execute a script, the Web browser must have an appropriate reference identifying the script. Thus, in response to a Web browser request for a Web page, a Web server typically sends down a list of client-side script references to the Web browser. If the Web browser already has access to the referenced script locally (e.g., cached from previously rendering the same Web page), the Web browser can execute the script. If the Web browser does not have access to the referenced script locally, it can download the script from the referenced location (e.g., at the Web server).

Due to the complexity of pages that that can be rendered at a Web browser as well as developer preferences, scripts can be stored in a variety of different locations, such as, for example, in disk-based files or in assembly-based resources (e.g., DLLs). Further, many common scripts may be reused by multiple resources in a Web pages. Additionally, various localized and globalized scripts may be available for execution. Accordingly, when providing a list of script references to a Web browser various inefficiencies, and even errors, can occur.

For example, if a script is to be used by multiple resources at a Web browser, the Web server may provide the Web browser with duplicate instances of the same client-side script reference to the script. Further, if a copy of a script is stored in multiple different locations, a Web server typically has no way to detect that it is in fact the same script and can send duplicate client-side references for the script.

Further, during script development, a developer may desire to debug a script. Thus, a developer may maintain a debug version as well as a release version of a script. The debug version of the script can provide various debug information to the developer to assist the developer in correcting unintended script behavior. To facilitate debugging, a server-side status can be manually toggled (from release) to debug. Thus, when the Web page is to be rendered, the Web server can send client-side references to debug versions of scripts to the Web browser. However, the server-side status is globally applicable to all scripts in a Web page. Thus, a developer has no way to send client-side references to some debug versions of scripts and client-side references to other release versions of scripts for a Web page.

BRIEF SUMMARY

The present invention extends to methods, systems, and computer program products for identifying appropriate client-side script references. A web server receives a Web page request from a Web browser. The Web server accesses a server side page that corresponds to the Web page. The Web server executes the server side page, including executing a script manager that is included in the server side page.

The script manager receives a registration request from one or more controls in the server side page during execution of the server side page. Each registration request requests registration of referenced scripts that are to be used at the Web browser to render the Web page. For each received registration request, the script manager processes the registration of each referenced script.

Processing a script reference registration includes determining if the referenced script is appropriately optimized for executing in a designated script execution environment at the Web browser. Processing a script reference registration also includes determining if the referenced script is stored in a location that is an appropriate script source. Processing a script reference registration additionally includes determining a new script reference for the references script based on the determinations. The new script reference indicates where the Web browser is to obtain an appropriate instance of the script. Processing a script reference registration also includes determining if the new script reference is already included in the list of script references as a result of processing a prior script reference registration request. Processing a script reference registration further includes including the new script reference in the list of script references when the new script reference is not already included in the list of script references.

The Web server then renders the list of script references to the Web browser in response to the Web page request.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
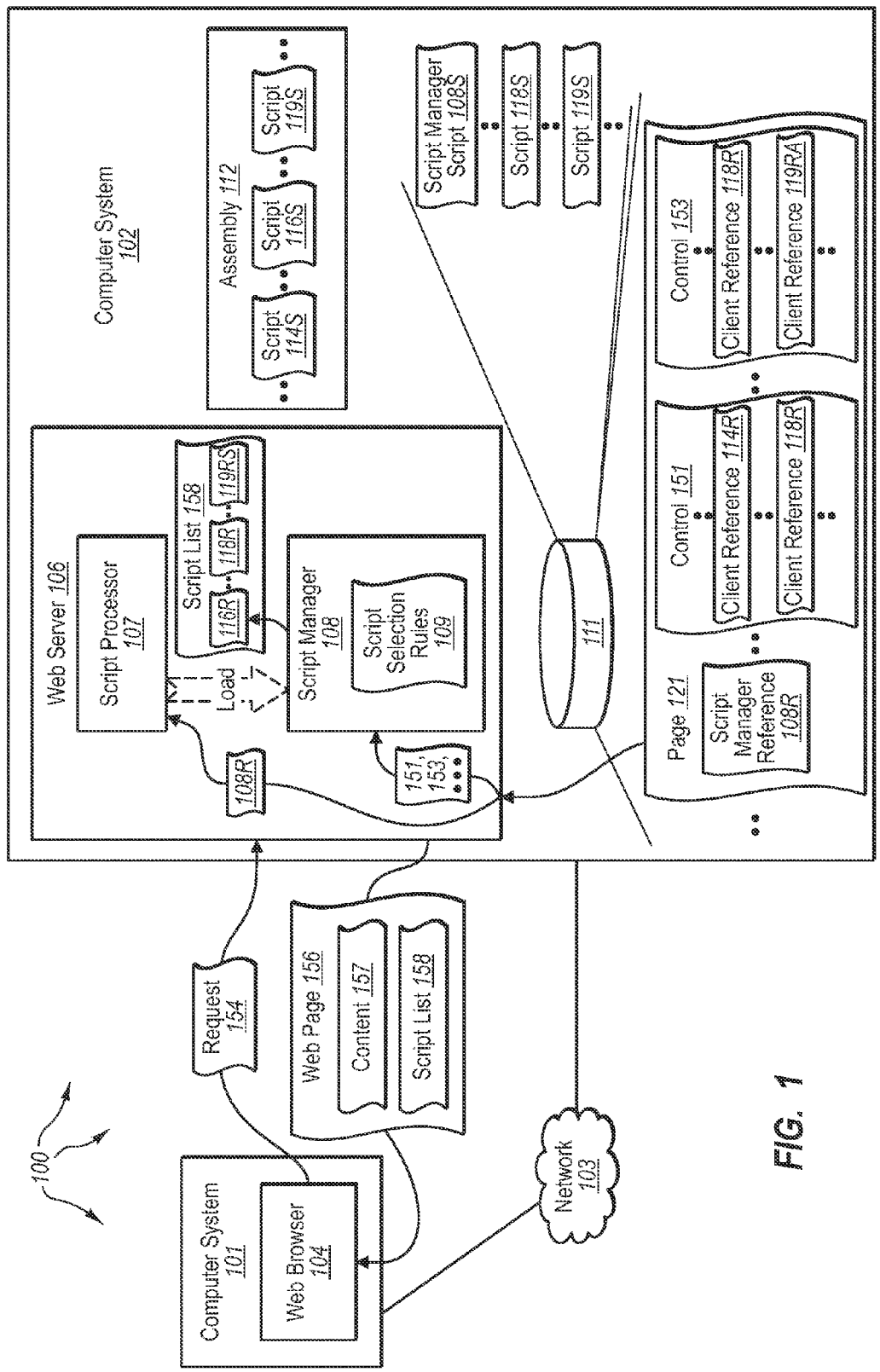
FIG. 1 illustrates an example computer architecture that facilitates identifying appropriate client-side script references.

The present invention extends to methods, systems, and computer program products for identifying appropriate client-side script references. A web server receives a Web page request from a Web browser. The Web server accesses a server side page that corresponds to the Web page. The Web server executes the server side page, including executing a script manager that is included in the server side page.

The script manager receives a registration request from one or more controls in the server side page during execution of the server side page. Each registration request requests registration of referenced scripts that are to be used at the Web browser to render the Web page. For each received registration request, the script manager processes the registration of each referenced script.

Processing a script reference registration includes determining if the referenced script is appropriately optimized for executing in a designated script execution environment at the Web browser. Processing a script reference registration also includes determining if the referenced script is stored in a location that is an appropriate script source. Processing a script reference registration additionally includes determining a new script reference for the references script based on the determinations. The new script reference indicates where the Web browser is to obtain an appropriate instance of the script. Processing a script reference registration also includes determining if the new script reference is already included in the list of script references as a result of processing a prior script reference registration request. Processing a script reference registration further includes including the new script reference in the list of script references when the new script reference is not already included in the list of script references.

The Web server then renders the list of script references to the Web browser in response to the Web page request.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable-type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates identifying appropriate client-side script references. As depicted, computer architecture 100 includes computer system 101, computer system 102, and network 103. Computer systems 101 and 102 include various computer system components including Web browser 104 and Web server 106 respectively. Each of the various components can be connected to network 103, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange HTTP requests and responses and Simple Object Access Protocol ("SOAP") envelopes containing Web service related data.

Web browser 104 can be configured to request Web-based content from Web servers, such as, for example, Web server 106, accessible via network 103. Web-based content can include text data, image data, audio/video data, executable code (e.g., scripts), etc. When executable code is received, such as, for example, a portion of Web-based application, the executable code can be executed by a script processor within Web browser 104.

Web server 106 is configured to receive Web browser requests, and return requested content back to a request Web browser. When Web server 106 receives a request, it can identify a server-side page that corresponds to the request (e.g., through dispatching the request to an appropriate process based on a URL contained in the request). Web server 106 can then load the identified server-side page.

When the server-side page includes server-side script references, Web server 106 can send the referenced server-side scripts (e.g., ASP.Net instructions) to script processor 107 for processing. Script processor 107 processes the server-side scripts and returns any corresponding results back to Web browser 106. Web browser 106 can then include the results (potentially after additional formatting), along with other content and any client-side script references, in a Web page. Web server 106 can then return the Web page to the requesting Web browser.

Thus, for example, it may be that Web browser 104 sends requests 154 (an HTTP get) to Web server 106 (by utilizing an appropriate URL for Web server 106). Web server 106 can process request 154 and generate/obtain corresponding content. The corresponding content and any client-side script references can be returned to Web browser 104 in Web page 156 (e.g., contained in an HTTP message). Client-side script references can reference scripts stored in various different locations at computer system 102, such as, for example, in the directory structure of storage 111, in assembly 112 (e.g., a dynamic link library ("DLL")), etc. Client-side script references can also reference scripts stored at other computer system, such as, for example, at other Web servers connected to network 103.

Server-side pages stored at computer system 102 can include server-side scripts that can be executed at Web server 106 to identify appropriate client-side script references to return to a Web browser. For example, page 121 includes script manager reference 108R referencing script manager script 108S. Script processor 107 can execute script manager script 108S to load script manager 108. Generally, script manager 108 is configured to receive a list of client-side references from a page associated with Web server 106. Script manager 108 is also configured to process a received list of client-side references, in accordance with script selection rules 109, to determine if the list of client-side references is to be modified before being returned to a Web browser.

Script selection rules 109 can include logic and policies for identifying an appropriate client-side reference to return to a Web browser based on a received client-side reference. Accordingly, script manager 108 can apply script selection rules 109 to client-side script references included in a server-side page and to client-side script references that result from the execution of logic and policies contained in script selection rules 109 to construct (a potentially modified) list of client-side script references to return to a Web browser.

For example, script selection rule logic can include algorithms for identifying and enumerating client-side script references for release and debug versions of a script. As such, script selection rules 109 can be used to automatically override the server-side debug settings of Web server 106. For example, script selection rules 109 can automatically identify and enumerate a client-side script reference for a debug version of a script in response to receiving a client-side script reference to for a release version of the script or vice versa.

Script selection rule logic can include algorithms for identifying and enumerating client-side script references from a plurality of different sources, such as, for example, assembly-based sources, file-based sources, and other sources. As such, script selection rules 109 can be used to enumerate client-side script references to a script at any other available sources in response to receiving a client-side script reference to the script at one source. For example, script selection rules 109 can automatically identify and enumerate a client-side script reference to a file-based source of a script in response to detecting a client-side script reference to an assembly-based source of the script included in a server-side page and vice versa.

Script selection rule logic can include algorithms for identifying and enumerating client-side script references for a plurality of differently localized versions of a script. As such script selection rules 109 can be used to enumerate client-side script references to a plurality of (and potentially all) differently localized versions of a script in response to receiving a client-side script reference to one localized version of the script. For example, script selection rules 109 can automatically identify and enumerate one or more client-side script references to French, Japanese, and German versions of a script in response to detecting a client-side script reference to an English-US version of the script included in a server-side page and vice versa.

Script selection rule logic can include algorithms for identifying and enumerating duplicate client-side script references. As such, script selection rules 109 can be used to automatically enumerate a plurality of client-side script references that all refer to the same script. Duplicate client-side references can be expressly included in a server page or can result through the execution of other script selection rule logic prior to duplicate detection.

Script selection rule policies indicate what client-side script reference, from an enumeration of a plurality of different client-side script references, are to be identified as appropriate for return to a Web browser. For example, in response to detecting a client-side script reference to an assembly-based source for a script in a server-side page, selection rule logic can determine that a client-side reference to a file-based source for the script also exists. The script selection rule logic can then refer to the script selection rule policies to determine which of the two client-side script references is to be returned to a Web browser. It may be that script selection rule policies indicate that file-based script access is preferred over assembly-based script access. Accordingly, the client-side script reference to the file-based source for a script can be provided to the Web browser, notwithstanding that the client-side script reference to the assembly-based source for the script was included in a server-side page.

Similar references to script selection rule policies can made to determine whether client-side script reference to a release or debug version of a script is to be returned to a Web browser. For example, script selection rule policies can indicate that scripts executed at a Web browser are being debugged. Accordingly, a client-side script reference to an debug version a script can be provided to the Web browser, notwithstanding that the client-side script reference a release version of the script was included in a server-side page.

Additionally, embodiments of the invention permit the author of the Web page to create custom rules for script selection. Custom script selection rules can include arbitrary logic based on the needs and desires of the Web page author. Script manager 108 can apply custom rules to each script reference in a page and either leave it alone or alter it to point at some alternate script location, etc. For example, a custom rule can be used to alter script references based on geography. Thus, if a client is in Europe and a server is in the United States, the script references might normally be from the same United States server. However, using custom script selection rules the script location can be adjusted to a European server to optimize the client experience.

Similar references to script selection rule policies can be made to determine whether a client-side script reference for a specified localized version of a script (e.g., based on functionality) is to be returned to a Web browser. For example, script selection rule policies can indicate that English-US versions of scripts are preferred based on a Web browser operating environment. Accordingly, a client-side script reference to an English-US version a script can be provided to the Web browser, notwithstanding that the client-side script reference to a French version of the script was included in a server-side page.

Further reference to script selection rule policies can made to determine how duplicate client-side script references are to be handled. For example, script selection rule policies can indicate that only one instance of a client-side script references is to be sent to a Web browser. Accordingly, a single instance of client-side script reference to a script can be provided to the Web browser. The single client-side script can be provided notwithstanding that the a plurality of instances of the client-side script reference were expressly included in a server page or identified through the execution of other script selection rule logic and reference to script selection rule policies (e.g., prior to referring to script selection rule policies to how duplicates are to be handled).

Figure 2:
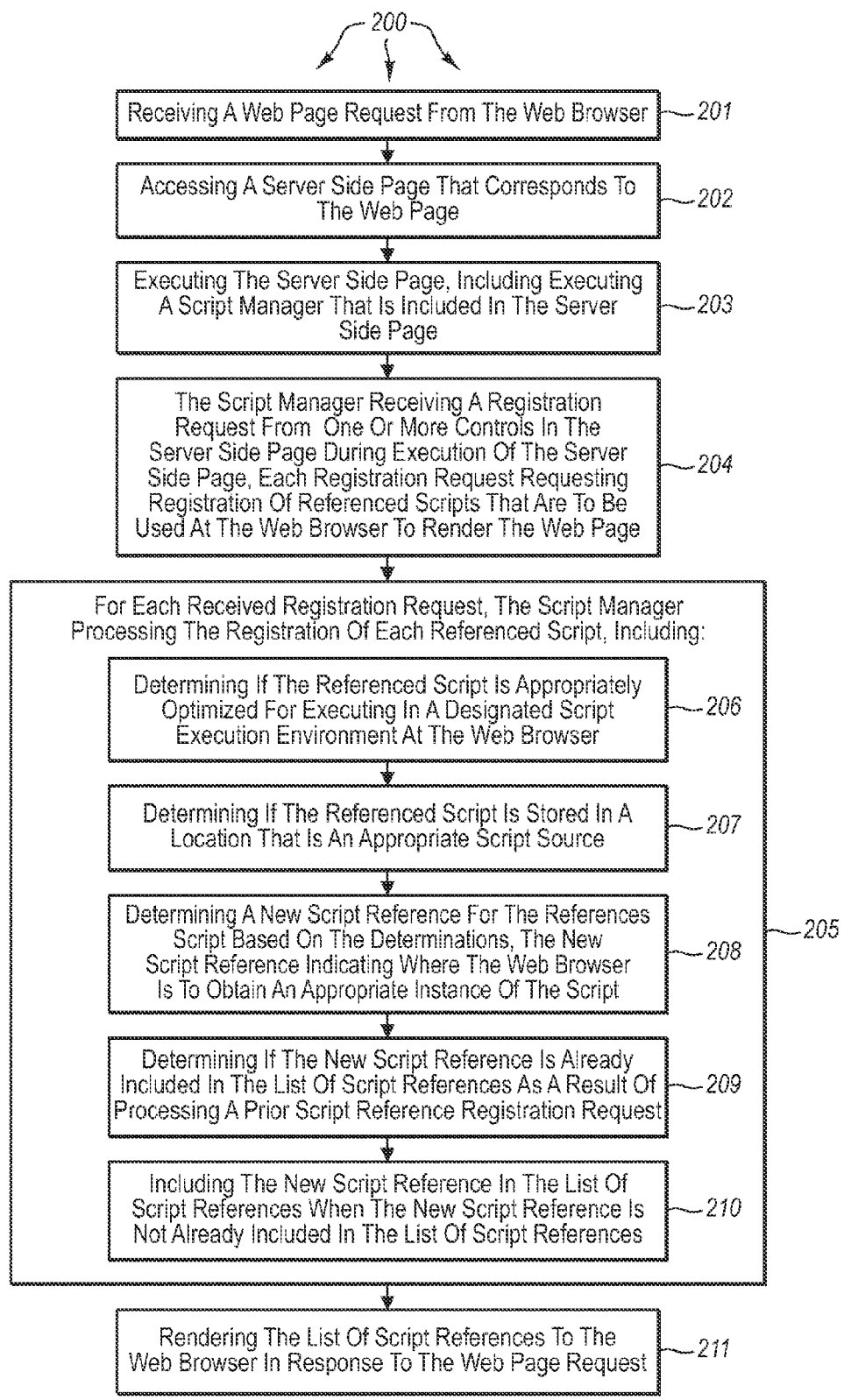
FIG. 2 illustrates a flow chart of an example method for identifying appropriate client-side script references.

FIG. 2 illustrates a flow chart of an example method 200 for identifying appropriate client-side script references. The method 200 will be described with respect to the components and data depicted in computer architecture 100.

Method 200 includes an act of receiving a Web page request from the Web browser (act 201). For example, Web server 106 can receive request 154 (e.g., an HTTP GET, POST, etc.) from Web browser 104. Method 200 includes an act of accessing a server side page that corresponds to the Web page (act 202). For example, Web server 106 can access page 121 (e.g., an ASP.Net page) from storage 111.

Method 200 includes an act of executing the server side page, including executing a script manager that is included in the server side page (act 203). For example, Web server 106 can execute page 121, including executing script manager 108. Web server 106 can identify script reference manager reference 108R as a reference to a server-side script. In response, Web server 106 can transfer script reference manager reference 108R to script processor 107. Script processor 107 can use script manager reference 108R to locate script manager script 108S in storage 111 (although the script manager script can also be stored at different script sources). Script processor executes script manager script 108S to load an instance of script manager 108. Upon execution, script manager 108 can create script list 158 for storing client-side script references to return to Web browser 104.

Method 200 includes an act of the script manager receiving a registration request from one or more controls in the server side page during execution of the server side page, each registration request requesting registration of referenced scripts that are to be used at the Web browser to render the Web page (act 204). For example, script manager 108 can receive a registration request from control 151 during execution of page 121. The registration request for control 151 can request registration of scripts 114S and 118S as referenced by client references 114R and 118R respectively. Similarly, script manager 108 can receive a registration request from control 153 during execution of page 121. The registration request for control 153 can request registration of scripts 118S and 119S as referenced by client references 118R and 119R respectively. Other controls included in page 121 can similar request registration for any referenced scripts.

For each received registration request, method 200 includes an act of the script manager processing the registration of each referenced script (act 205). For example, for a received registration request for control 151, script manager 108 can process the registration of script 114S.

Method 200 includes an act of determining if the referenced script is appropriately optimized for executing in a designated script execution environment at the Web browser (act 206). For example, script manager 108 can refer to script selection rules 109 to determine if script 114S is appropriately optimized for executing in a designated script execution at Web browser 104. Determining if a script is appropriately optimized for executing in an execution environment can include determining if the release/debug version of the script corresponds to the current server settings. For example, script manager 108 can determine if script 114S is a debug or release version of a script and if execution settings at Web server 106 indicate debug or release mode. Determining if a script is appropriately optimized for executing in an execution environment can include determining if a script is appropriately localized for execution at the Web browser. For example, script manager 108 can determine if the localization of script 114S matches the localized execution environment of Web browser 104.

Method 200 includes an act of determining if the referenced script is stored in a location that is an appropriate script source (act 207). For example, script manager 108 can refer to script selection rules 109 to determine if assembly 112 is a location that is an appropriate script source. Determining if the referenced script is stored in a location that is an appropriate script source can include determining if the script source is an assembly-base source or a file-based source. For example, script manager 108 can determine (for script 114S) if assembly 112 is an appropriate script source. Determining if the referenced script is stored in a location that is an appropriate script source can also include determining if file-based sources are preferred over assembly-based sources or vice versa. For example, script manager 108 can determine if script access from storage 111 is preferred to script access from assembly 112.

Method 200 includes determining a new script reference for the referenced script based on the determinations, the new script reference indicating where the Web browser is to obtain an appropriate instance of the script (act 208). For example, script manager can calculate a new client reference for client reference 114S based on whether script 114S is appropriately optimized for execution at Web browser 103 and based on whether assembly 112 is an appropriate script source. When a script is appropriately optimized and the location is an appropriate script source, a calculated new script reference can be the same as a received script reference received in a registration request. For example, if script 114S is appropriately optimized for execution at Web browser 104 and assembly 112 is an appropriate script source, the calculated new script reference can remain client reference 114R.

However, when a script is not appropriately optimized and/or the location is not appropriate source, a calculated new script reference can be the different than a script reference received in a registration request. As described, upon receiving a client-side script reference, script selection rule logic can execute to enumerate various other client-side script references based on the received client-side script reference. The enumerated client-side script references can reference scripts for different release/debug mode versions and differently localized versions, etc., of the script referenced by the received client-side script reference. The enumerated client-side script references can also reference other script sources (at computer system 102 or at other computer systems) for the script referenced by the received client-side script reference (e.g., when the script is accessible via a plurality of script sources).

Thus, script manager 108 can apply script selection rule policies to any enumerated client-side script references to select a new client-side script reference from among the enumerate client-side script references. Accordingly, a new client-side script reference can refer to a different script that is appropriately optimized and is accessible via an appropriate script source. A new client-side script reference can reference a different script than a received client-script reference, for example, a script that corresponds to a current debug/release mode, an appropriately localized script, and/or a script from a different script source. For example, script manager 108 can determine that script 116S is a more appropriate instance of script 114S. Accordingly, script manager 108 can determine that client reference 116R (a reference to script 116S) is to be substituted for client reference 114R (a reference to script 114S), when returning a list of client-side script references to Web browser 104.

Method 200 includes an act of determining if the new script reference is already included in the list of script references as a result of processing a prior script reference registration request (act 209). For example, script selection rule logic can determine if client reference 116R is already included script list 158 (from processing other client references in page 121). Method 200 includes an act of including the new script reference in the list of script references when the new script reference is not already included in the list of script references (act 210). For example, script manager 108 can include client reference 116R in script list 158.

Script manager 108 can process the registration requests for other referenced scripts. For example, script manager 108 can process other client references in controls 151 and 153. As part of processing other client references, script manager can perform acts 206 through 210.

For example, script manager 108 can process the instance of client reference 118R (referencing script 118S) in control 151. Script manger 108 can determine that script 118S is appropriately optimized for execution in the execution environment of Web browser 104. Script manger 108 can further determine that storage 111 is an appropriate (e.g., preferred) script source. As such, script manger 108 can determine that a new script reference for script 118S is to remain client reference 118R. Script manager 108 can determine that client reference 118R is not already stored in reference list 158. Accordingly, script manager 108 can store client reference 118R (from control 151) in script list 158.

Next, script manager 108 can process the instance of client reference 118R (referencing script 118S) in control 153. Script manger 108 can determine that script 118S is appropriately optimized for execution in the execution environment of Web browser 104. Script manger 108 can further determine that storage 111 is an appropriate (e.g., preferred) script source. As such, script manger 108 can determine that a new script reference for script 118S is to remain client reference 118R. However, script manager 108 then determines that client reference 118R is already stored in reference list 158 (i.e., script reference 118R is detected as a duplicate). Accordingly, script manager 108 discards client reference 118R (from control 153) and does not include client reference 118R in script list 158.

Next, script manager 108 can process client reference 119RA (referencing script 119S in assembly 112) in control 153. Script manger 108 can determine that script 119S is appropriately optimized for execution in the execution environment of Web browser 104. Script manger 108 can further determine that storage 111 is preferred over assembly 112 as a script source. Thus, script manager 108 can scan any client references that were enumerated based client reference 119RA. As a result of the scan, script manager 108 can determine that an instance of script 119S is also stored in storage 111.

As such, script manger 108 can determine that a new script reference for script 119S is to be client reference 119RS (referring to the instance of scrip 119S in storage 111). Script manager 108 can determine that client reference 119RS is not already stored in reference list 158. Accordingly, script manager 108 can store client reference 118RS in script list 158.

Script manager 108 can similarly process client references in other controls of page 121 to appropriately populate script list 158.

Method 200 includes an act of rendering the list of script references to the Web browser in response to the Web page request (act 211). For example, Web server 106 can return Web page 156 to Web browser 104. Web page 156 includes content 157 (e.g., contained in page 121 or generated by controls in page 121) and script list 158.

Web browser 104 can receive Web page 156. Web browser 104 can execute scripts referred to in scripts list 158 to add further content to Web page 156 or to perform other processing.

Thus, embodiments of the invention facilitate tailoring a list of script references to send to a Web browser based on a list of script references included in a server page. Referenced scripts sent to a Web browser can differ from referenced scripts included in the server page. Script references sent to a Web browser can refer to scripts optimized for the execution environment of the Web browser and to scripts stored at preferred script sources. Further, duplicate script references are removed prior to sending a list of script references to the Web browser. Since script lists sent to Web browsers are tailored for the execution environment of the Web browsers and duplicates are removed, scripts can be loaded and processed more effectively at Web browsers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a Web server, a method for identifying appropriate client-side script references, the method comprising:
    an act of receiving, at a Web server, a Web page request from a Web browser;
    an act of accessing a server side page that corresponds to the requested Web page, the server side page including a script manager reference that references a script manager script;
    an act of executing the server side page, including executing the script manager referenced by the script manager reference to load the script manager;
    an act of the script manager receiving a list of client-side script references that are to be included in the Web page to be sent to the Web browser;
    an act of the script manager determining, based on script selection rules, whether the list of client-side script references is to be modified prior to sending the list to the Web browser, including, for at least one client-side script reference in the list:
        (i) a first act of determining, based on the script selection rules, if the client-side script referenced by the client-side script reference is appropriately optimized for executing in a designated script execution environment at the Web browser; or
        (ii) a second act of determining, based on the script selection rules, if the client-side script referenced by the client-side script, reference is stored in a location that is an appropriate source;
    an act of the script manager modifying the list of client-side script references by replacing at least one client-side script reference in the list with a different client-side script reference that was selected as a more appropriate client-side script reference based on the script selection rules, wherein modifying the list includes replacing a client-side script reference that references a release version of a client-side script with a client-side script reference that references a debug version of a client-side script; and
    an act of sending the modified list of client-side script references to the browser to be used in rendering the Web page.

2. The method as recited in claim 1, wherein the act of receiving a Web page request from the Web browser comprises an act of receiving a HyperText Transfer Protocol GET message.

3. The method as recited in claim 1, wherein the act of accessing a server side page that corresponds to the Web page comprises an act of accessing an ASP.NET page.

4. The method as recited in claim 1, wherein the act of determining if the client-side script referenced by the client-side script reference is appropriately optimized for executing in a designated script execution environment at the Web browser comprises an act of determining if the referenced script is a release mode version script or a debug mode version script.

5. The method as recited in claim 1, wherein the act of determining if the client-side script referenced by the client-side script reference is appropriately optimized for executing in a designated script execution environment at the Web browser comprises an act of determining the geographic location were the Web browser is located.

6. The method as recited in claim 1, wherein the act of determining if the client-side script referenced by the client-side script reference is appropriately optimized for executing in a designated script execution environment at the Web browser comprises an act of determining if the referenced script is appropriately localized for executing in the execution environment of the Web browser.

7. The method as recited in claim 1, wherein the act of determining if the client-side script referenced by the client-side script reference is stored in a location that is an appropriate source comprises an act of determining if the source is a disk-based source or an assembly-based source.

8. The method as recited in claim 1, further comprising:
    for at least one client-side script reference in the list, an act of enumerating other client-side script references to different versions of the client-side script referenced by the client-side script reference prior to replacing the client-side script reference in the list with a different client-side script reference.

9. The method as recite in claim 1, wherein modifying the list includes replacing a client-side script reference that references a version of a client-side script that targets a first geographic location with a client-side script reference that references a version of the client-side script that targets a second geographic location.

10. The method as recite in claim 1, wherein modifying the list includes replacing a client-side script reference that references a first version of a client-side script with a client-side script reference that references a second version of the client-side script, wherein the second version, but not the first version, is appropriately localized for execution at the Web browser.

11. The method as recite in claim 1, wherein modifying the list includes replacing a client-side script reference that references a version of a client-side script that is stored in a first source with a client-side script reference that references a version of the client-side script that is stored in a second source that is different than the first source.

12. The method as recite in claim 11, wherein the first and second sources each are either a disk or an assembly based source.

13. The method as recited in claim 1, wherein the act of modifying the list further comprises:
   an act of determining that a first client-side script reference that is selected to replace a second client-side script reference in the list is already included in the list; and
   an act of removing the second client-side script reference from the list and an act of not adding the first client-side script reference selected to replace the second client-side script reference to the list.

14. The method as recite in claim 1, wherein the an act of sending the modified list to the Web browser comprises an act of sending an HTTP message that includes content and the modified list to the Web browser.

15. A computer program product for use at a Web server, the computer program product for implementing a method for identifying appropriate client-side script references, the computer-program product comprising one or more computer-readable media having stored thereon computer-executable instructions that, when executed at a processor, cause the Web server to perform the method of claim 1.

16. The computer program product as recited in claim 15, further comprising computer-executable instructions that, when executed, cause the Web server to perform the following:
   for at least one client-side script reference in the list, an act of enumerating other-client-side script references to different versions of the client-side script referenced by the client-side script reference prior to replacing the client-side script reference in the list with a different client-side script reference.

17. The computer program product as recited in claim 15, further comprising computer-executable instructions that, when executed, cause the Web server to perform the following:
   an act of determining that a first client-side script reference that is selected to replace a second client-side script reference in the list is already included in the list; and
   an act of removing the second client-side script reference from the list and an act of not adding the first client-side script reference selected to replace the second client-side script reference to the list.

18. The computer program product as recited in claim 15, wherein the act of sending the modified list of client-side script references to the browser to be used in rendering the Web page comprises an act of sending an HTTP message that includes content and the list to the Web browser.

* * * * *